United States Patent
Croak et al.

(10) Patent No.: US 8,614,959 B1
(45) Date of Patent: Dec. 24, 2013

(54) METHOD AND APPARATUS FOR CERTIFYING A SIGNAL MESSAGE IN A COMMUNICATIONS NETWORK

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 937 days.

(21) Appl. No.: 11/389,850

(22) Filed: Mar. 27, 2006

(51) Int. Cl.
*H04L 1/24* (2006.01)

(52) U.S. Cl.
USPC .......................................... 370/252; 370/242

(58) Field of Classification Search
USPC ............... 370/252, 352, 389, 395.52, 395.61, 370/410, 420
See application file for complete search history.

(56) References Cited

U.S. PATENT DOCUMENTS

| | | | | |
|---|---|---|---|---|
| 7,257,109 B2* | 8/2007 | Sylvain | ......................... | 370/352 |
| 7,460,480 B2* | 12/2008 | Awais | ............................ | 370/236 |
| 7,570,765 B1* | 8/2009 | Eslambolchizadeh | ........ | 380/257 |
| 2002/0114274 A1* | 8/2002 | Sturges et al. | ................ | 370/229 |
| 2002/0131604 A1* | 9/2002 | Amine | ............................ | 381/58 |
| 2004/0261116 A1* | 12/2004 | Mckeown et al. | ............ | 725/109 |
| 2005/0265240 A1* | 12/2005 | Jain et al. | ...................... | 370/241 |
| 2006/0062230 A1* | 3/2006 | Bachner et al. | ............... | 370/401 |
| 2006/0146792 A1* | 7/2006 | Ramachandran et al. | .... | 370/352 |
| 2006/0274760 A1* | 12/2006 | Loher | ...................... | 370/395.52 |
| 2007/0070990 A1* | 3/2007 | Chong et al. | .................. | 370/356 |

* cited by examiner

*Primary Examiner* — Michael Thier
*Assistant Examiner* — Curtis A Alia

(57) ABSTRACT

A method and apparatus for testing a message set in a communications network are described. In one embodiment, a change in the communications network is initially detected. Communication between a customer premise equipment (CPE) and at least one border element in the communication network is subsequently established. Afterwards, a test suite is executed to simultaneously certify that a message set employing a plurality of protocols supported by the communication network is supported by the at least one border element.

15 Claims, 4 Drawing Sheets

METHOD AND APPARATUS FOR CERTIFYING A SIGNAL MESSAGE IN A COMMUNICATIONS NETWORK

BACKGROUND OF THE INVENTION

1. Field of the Invention

Embodiments of the present invention generally relate to telecommunications systems and, more particularly, to a method and apparatus for certifying a signal message in a communications network, such as a packet network, e.g., a voice over internet protocol (VoIP).

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VoIP) network.

In an effort to accommodate a larger customer base, providers of VoIP network services often support multiple customer premise equipment (CPE) technologies. However, these differing CPE technologies may utilize diverse protocols that often require the support of various network interfaces (e.g., a media gateway control protocol (MGCP), a session initiation protocol (SIP), and an H.323 protocol). Consequently, the network must occasionally test signal messages communicated between the CPE or endpoint devices and the network to ensure that service is not compromised. However, the separate testing of each access protocol may be a time consuming process.

Thus, there is a need in the art for an improved method and apparatus for certifying a signal message in a communications network.

SUMMARY OF THE INVENTION

In one embodiment, method and apparatus for testing a message set in a communications network are described. Specifically, a change in the communications network is initially detected. Communication between customer premise equipment (CPE) and at least one border element in the communication network is subsequently established. Afterwards, a test suite is executed to simultaneously certify that a message set employing a plurality of protocols supported by the communication network is supported by the at least one border element.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
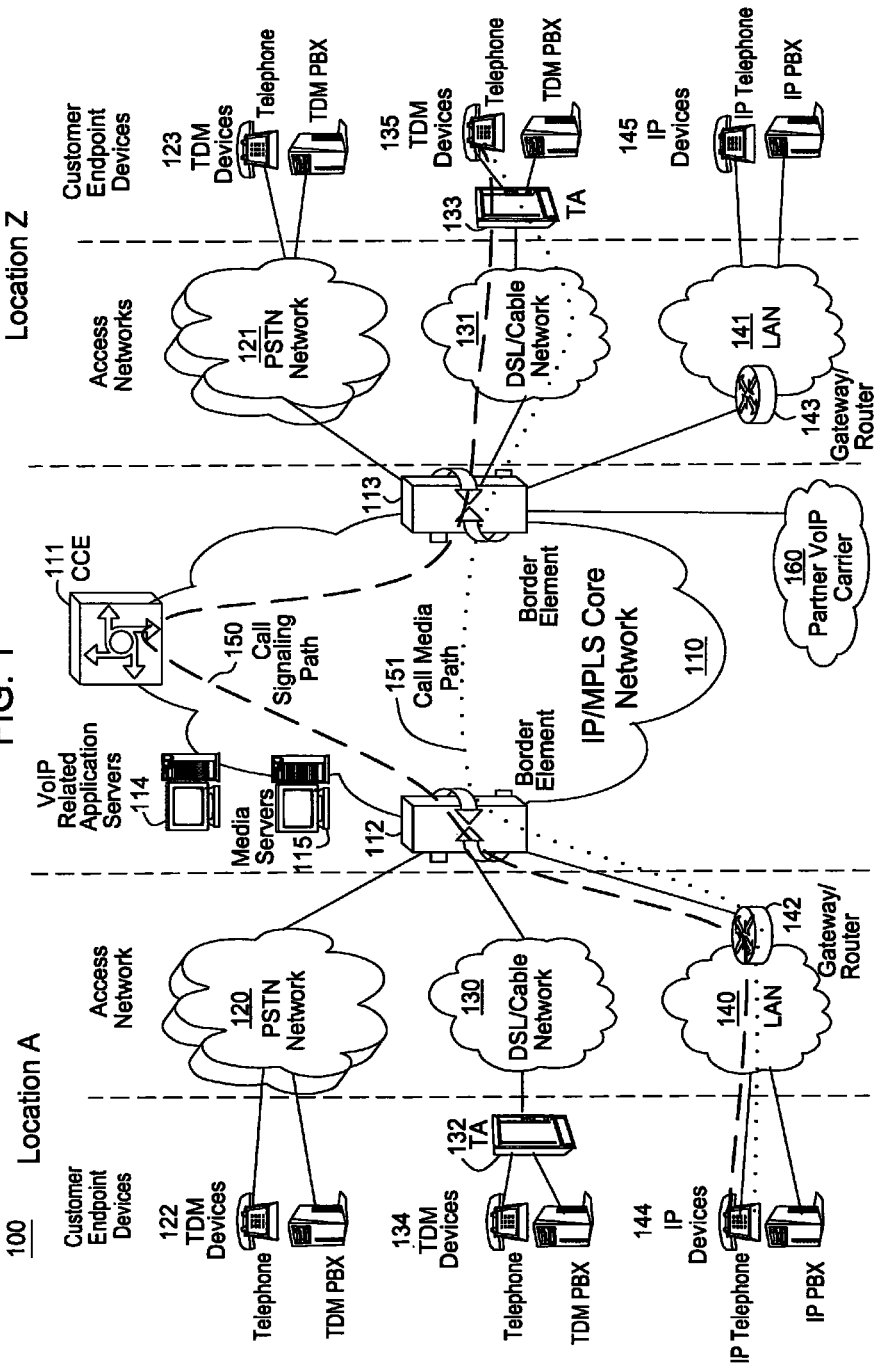
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
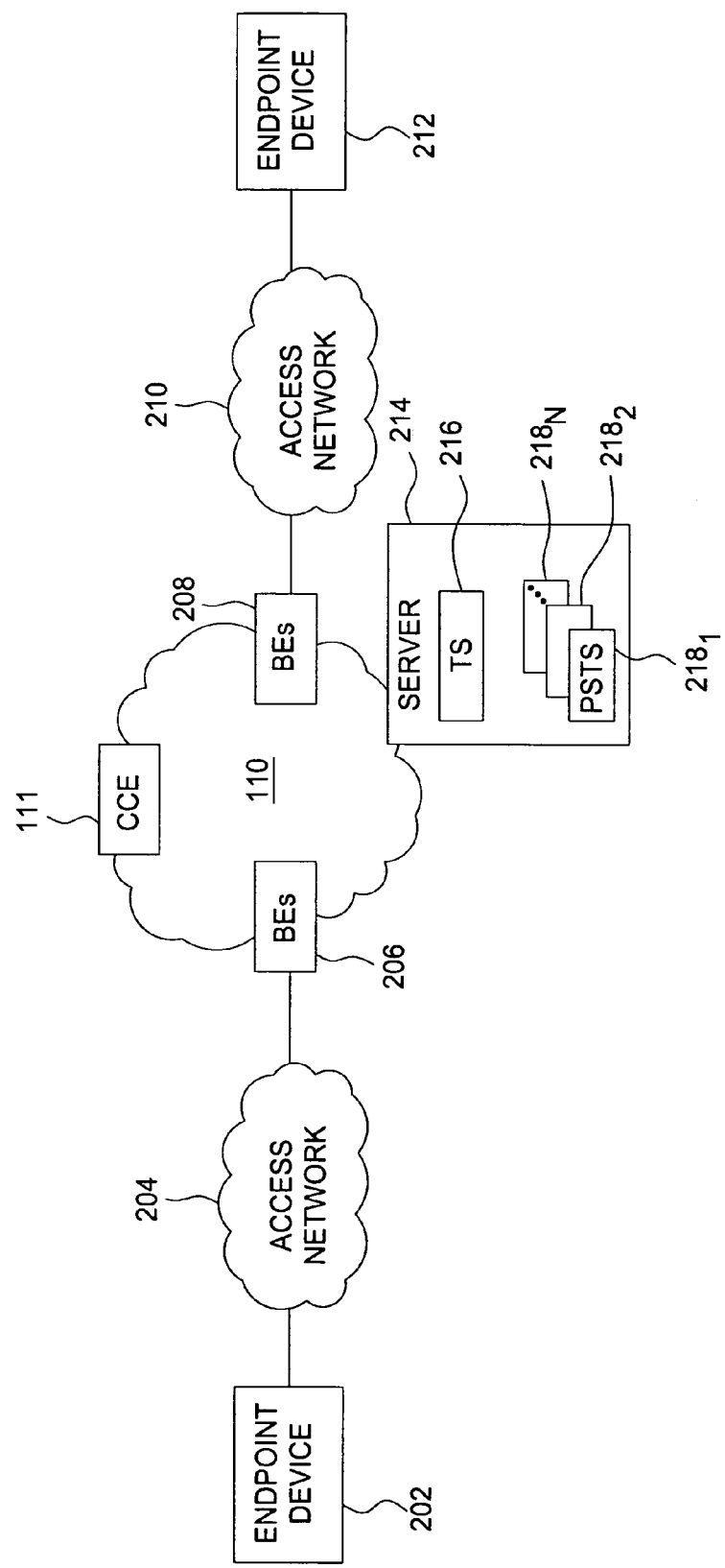
FIG. 2 is a block diagram depicting an exemplary configuration of the communication system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and at least one border element (BE) 206. An endpoint device 212 is configured for communication with the core network 110 via an access network 210 and at least one BE 208. The endpoint device 202 and the endpoint device 212 may comprise any of the customer endpoint devices described above (e.g., TDM devices, IP devices, CPE, etc.). The access networks 204 and 210 may comprise any of the access networks detailed above (e.g., PSTN, DSL/Cable, LAN, etc).

The core network 110 further includes a server 214 that is configured to store and execute a single test suite 216 that comprises automated tests for certifying message sets that correspond with a plurality of access protocols supported by the core network 110. A message set may comprise various signal message "types" that exist for each access protocol. For example, a message set may include a call setup message, a send acknowledgement message, a call signaling message, a call termination message, or any other like signal message that is communicated between customer premise equipment (CPE) and at least one BE. It should be noted that the CPE may comprise various equipment, e.g., a TA, a modem, a router, a switch, and the like. In one embodiment, the test suite 216 is capable of certifying all message sets at one time (i.e., simultaneously) by testing the common aspects that exist among the various (or a predefined number of) VoIP based access protocols (e.g., media gateway control protocol (MGCP), session initiation protocol (SIP), and H.323). For instance, the test suite 216 may be used to certify the use of certain signaling transport (e.g., user datagram protocol) or the utilization of a particular dual tone multi-frequency (DTMF) relay transport (e.g., RFC 2883). Similarly, the test suite 216 may certify that a T.38 fax-relay transport is used. The server 214 may also store and execute separate protocol-specific test suites $218_{1...n}$ to certify the remaining "uncommon" aspects that do not match the other access protocols.

The utilization of the test suite 216 eliminates the need to test each signal message separately (i.e., for each protocol). More specifically, it is not necessary to separately test and certify that a given signal message is associated with each and every protocol that is supported by the BE. The separate and independent testing of protocols is typically a time consuming process due to the repetition of tests. Although the common aspects present in all of the supported protocols are sufficiently tested, unique aspects of a particular protocol may need to be tested by a unique test. Notably, the individual protocol specific test suites $218_{1...n}$ (e.g., one PSTS for each separate protocol) may be used in this type of scenario.

In one embodiment, the application server 214 is configured to test (or certify) the protocols that facilitate the communication between the network BEs and various endpoint devices (e.g., CPEs). The application server 214 is typically configured to execute the test suite 216 upon the occurrence of a predefined change or modification to the network. The change to the network may either be software related (e.g., involving a modification of an encoding algorithm utilized by the BEs) or hardware related (e.g., the addition of a new router to the network). Upon the occurrence of such a predefined network change (or alternatively, upon the request of a network operator), the application server 214 establishes communication with at least BE in the network. The application server 214 then initiates a test suite 216 that is programmed to test at least one signaling message communication between the BE and a CPE (e.g., BE 206 and endpoint device 202) in an attempt to certify the associated protocol.

Figure 3:
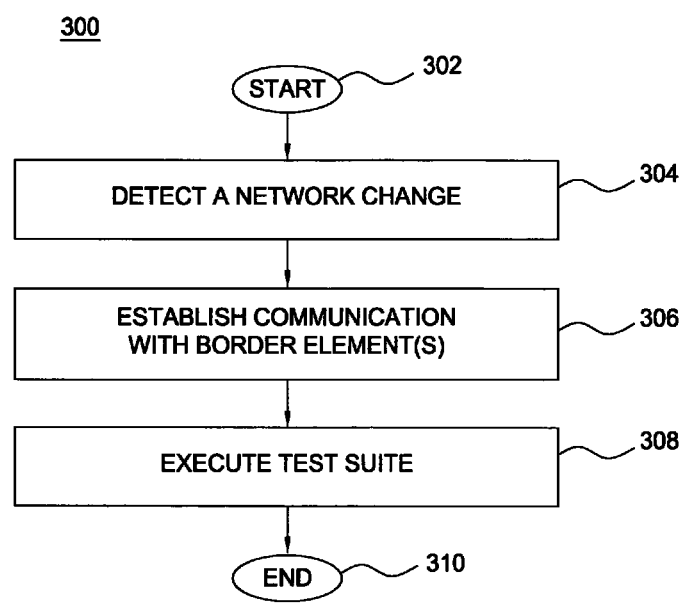
FIG. 3 is a flow diagram depicting an exemplary embodiment of a method for certifying a signal message in a communications network in accordance with one or more aspects of the invention.

FIG. 3 is a flow diagram depicting an exemplary embodiment of a method 300 for certifying a signal message in a communication network in accordance with one or more aspects of the invention. The method 300 may be performed by the application server 214. The method 300 begins at step 302 and proceeds to step 304 where a network change or modification is detected. In one embodiment, the application server 214 detects a modification, such as the addition of a new router, in a communications network. Alternatively, a network operator may initiate the process manually at his/her discretion without the need for a change in the network.

At step 306, communication between an CPE with a border element is established. In one embodiment, the application server 214 contacts at least one border element and establishes a line of communication.

At step 308, a test suite is executed. In one embodiment, the application server 214 executes a test suite in order to certify a signal message (communicated between the border element and a CPE) from a message set that is associated with one of a plurality of predefined protocols employed by the border element. For example, the test suite may cause a border element to communicate a "send acknowledgement" message in a particular protocol with the CPE. If the border element is supposed to support a plurality of protocols, then the test suite will presume that a proper handling of the "send acknowledgement" message in one protocol will translate into proper handling of the "send acknowledgement" message in all supported protocols.

At step 310, the method 300 ends.

Figure 4:
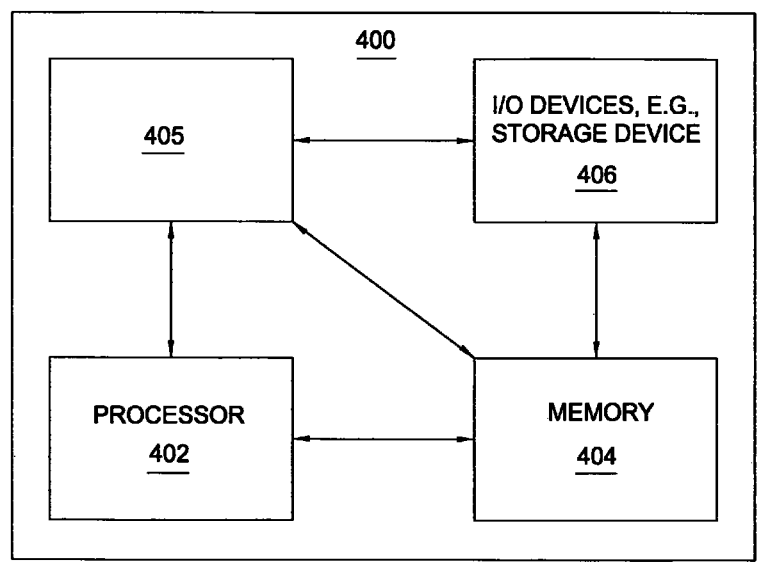
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for certifying a signal message in a communications network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 405 for certifying a signal message can be loaded into memory 404 and executed by processor 402 to implement the functions as discussed above. As such, the present process 405 for certifying a signal message (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for certifying a signal message set in a communication network, comprising:
   in response to a network change, establishing communication between a customer premise equipment and a border element in the communication network, via an application server; and
   executing, via the application server, a test suite to simultaneously certify that the signal message set that is associated with a plurality of protocols that is communicated between the customer premise equipment and the border element is supported by the border element by testing a common aspect that exists among the plurality of protocols, wherein the plurality of protocols comprises a media gateway control protocol, a session initiation protocol, and an H.323 protocol.

2. The method of claim 1, wherein the communication network comprises an internet protocol network.

3. The method of claim 2, wherein the internet protocol network comprises a voice over internet protocol network.

4. The method of claim 1, further comprising:
   detecting a change in the communication network.

5. The method of claim 1, where the signal message set comprises at least one of: a call setup message, a send acknowledgement message, a call signaling message, or a call termination message.

6. An apparatus for certifying a signal message set in a communication network, comprising:
   an application server comprising a processor, and a computer-readable medium storing a plurality of instructions which, when executed by the processor, cause the processor to perform operations, the operations comprising:
      in response to a network change, establishing communication between a customer premise equipment and a border element in the communication network; and
      executing a test suite to simultaneously certify that the signal message set that is associated with a plurality of protocols that is communicated between the customer premise equipment and the border element is supported by the border element by testing a common aspect that exists among the plurality of protocols, wherein the plurality of protocols comprises a media gateway control protocol, a session initiation protocol, and an H.323 protocol.

7. The apparatus of claim 6, wherein the communication network comprises an internet protocol network.

8. The apparatus of claim 7, wherein the internet protocol network comprises a voice over internet protocol network.

9. The apparatus of claim 6, further comprising:
   detecting a change in the communication network.

10. The apparatus of claim 6, where the signal message set comprises at least one of: a call setup message, a send acknowledgement message, a call signaling message, or a call termination message.

11. A non-transitory computer-readable medium storing a plurality of instructions which, when executed by a processor, causes the processor to perform operations for certifying a signal message set in a communication network, the operations comprising:

in response to a network change, establishing communication between a customer premise equipment and a border element in the communication network, via an application server; and executing, via the application server, a test suite to simultaneously certify that the signal message set that is associated with a plurality of protocols that is communicated between the customer premise equipment and the border element is supported by the border element by testing a common aspect that exists among the plurality of protocols, wherein the plurality of protocols comprises a media gateway control protocol a session initiation protocol and an H.323 protocol.

12. The non-transitory computer readable medium of claim 11, wherein the communication network comprises an internet protocol network.

13. The non-transitory computer readable medium of claim 12, wherein the internet protocol network comprises a voice over internet protocol network.

14. The non-transitory computer readable medium of claim 11, further comprising:
detecting a change in the communication network.

15. The non-transitory computer readable medium of claim 11, where the signal message set comprises at least one of: a call setup message, a send acknowledgement message, a call signaling message, or a call termination message.

* * * * *